United States Patent
Sibbach

(10) Patent No.: US 10,788,394 B2
(45) Date of Patent: Sep. 29, 2020

(54) GEARBOX SENSOR ARRANGEMENT

(71) Applicant: General Electric Company, Schenectady, NY (US)

(72) Inventor: Arthur William Sibbach, Boxford, MA (US)

(73) Assignee: General Electric Company, Schenectady, NY (US)

( * ) Notice: Subject to any disclaimer, the term of this patent is extended or adjusted under 35 U.S.C. 154(b) by 468 days.

(21) Appl. No.: 15/701,912

(22) Filed: Sep. 12, 2017

(65) Prior Publication Data
US 2019/0078975 A1  Mar. 14, 2019

(51) Int. Cl.
G01M 13/028 (2019.01)
F16H 57/01 (2012.01)
F02C 7/36 (2006.01)
F16H 1/28 (2006.01)

(52) U.S. Cl.
CPC ............ G01M 13/028 (2013.01); F02C 7/36 (2013.01); F16H 57/01 (2013.01); F05D 2260/407 (2013.01); F05D 2260/40311 (2013.01); F05D 2260/80 (2013.01); F05D 2260/96 (2013.01); F05D 2270/334 (2013.01); F05D 2270/807 (2013.01); F16H 1/28 (2013.01); F16H 2057/012 (2013.01)

(58) Field of Classification Search
CPC ................................................ G01M 13/028
USPC ........................................................ 702/56
See application file for complete search history.

(56) References Cited

U.S. PATENT DOCUMENTS

| 5,661,659 | A | 8/1997 | Forecast et al. |
| 7,912,659 | B2 | 3/2011 | Luo |
| 7,945,397 | B2 | 5/2011 | Kar |
| 8,393,993 | B2* | 3/2013 | Demtroeder ............ F03D 17/00 475/331 |
| 8,473,252 | B2 | 6/2013 | Kar et al. |
| 8,532,828 | B2 | 9/2013 | Schramm et al. |
| 8,572,009 | B2 | 10/2013 | Harris |
| 8,892,366 | B2 | 11/2014 | Doleschel et al. |
| 9,677,659 | B1* | 6/2017 | Niergarth ................. F02C 7/36 |
| 10,168,248 | B1* | 1/2019 | Morey ............... G01M 13/021 |
| 2011/0230304 | A1* | 9/2011 | Morel .................... B64C 27/12 475/331 |
| 2017/0219080 | A1* | 8/2017 | Niergarth ................. F02C 7/36 |
| 2017/0261047 | A1* | 9/2017 | Fujii ..................... F16D 25/123 |

FOREIGN PATENT DOCUMENTS

WO   2015076518 A1   5/2015

* cited by examiner

*Primary Examiner* — Ricky Ngon
(74) *Attorney, Agent, or Firm* — McGarry Bair PC

(57) ABSTRACT

A gearbox monitoring system can include a fan, compressor, combustor, and turbine in axial flow arrangement, with corresponding rotating components mounted to a shaft, and a gearbox assembly operably coupled to the shaft and connecting the turbine and the fan. The gearbox assembly can include a carrier, a sun gear, at least one planet gear, and a ring gear. An oil feed tube is coupled to the gearbox for lubricating at least one of the sun, ring or planet gears. A plurality of bearings rotationally supports at least one of the sun gear, ring gear, or planet gear relative to the carrier. In addition, at least one vibration sensor is carried by one of the carrier or ring gear and is in wireless communication with an engine control unit or health monitoring unit.

20 Claims, 4 Drawing Sheets

US 10,788,394 B2

GEARBOX SENSOR ARRANGEMENT

BACKGROUND OF THE INVENTION

Turbine engines, and particularly gas or combustion turbine engines, are rotary engines that extract energy from a flow of combusted gases passing through the engine onto a multitude of rotating turbine blades.

A turbine can rotationally drive a turbine shaft, which can rotationally drive a fan through a power gearbox of an epicyclic gearing arrangement. The power gearbox can rotatably support a sun gear disposed centrally with respect to a ring gear and a plurality of planet gears, which are disposed around the sun gear and engage between the sun gear and the ring gear. Each planet gear meshes with the sun gear and with the ring gear. Vibration of the gearbox can be a result of the gears operating at undesired frequencies and can cause cracks or other undesired distortions in the parts or components of the gearbox.

BRIEF DESCRIPTION OF THE INVENTION

In one aspect, the present disclosure relates to a gearbox assembly including a carrier, an epicyclic gear including a sun gear, a ring gear encircling the sun gear, and a planet gear enmeshed with both the sun gear and ring gear. An oil feed tube is coupled to the gearbox for lubricating at least one of the sun, ring or planet gears. A plurality of bearings rotationally supports at least one of the sun gear, ring gear, or planet gear relative to the carrier. In addition, at least one vibration sensor is carried by one of the carrier or ring gear.

In another aspect, the present disclosure relates to a gearbox monitoring system including a fan, compressor, combustor, and turbine in axial flow arrangement, with corresponding rotating components mounted to a shaft, a gearbox assembly operably coupled to the shaft and connecting the turbine and the fan, the gearbox assembly including a carrier, an epicyclic gear including a sun gear, a ring gear encircling the sun gear, and a planet gear enmeshed with both the sun gear and ring gear. An oil feed tube is coupled to the gearbox for lubricating at least one of the sun, ring or planet gears. A plurality of bearings is rotationally supporting at least one of the sun gear, ring gear, or planet gear relative to the carrier. In addition, at least one vibration sensor is carried by one of the carrier or ring gear and is in wireless communication with an engine control unit or health monitoring unit.

In yet another aspect, the present disclosure relates to a method of monitoring a gas turbine engine having a gearbox, the method including sensing vibrations of at least one bearing in the gearbox with a sensor located on the gearbox and outputting a vibration signal, converting the vibration signal into vibration data, and transmitting the vibration data to a health monitoring unit.

DETAILED DESCRIPTION OF THE INVENTION

Figure 1:
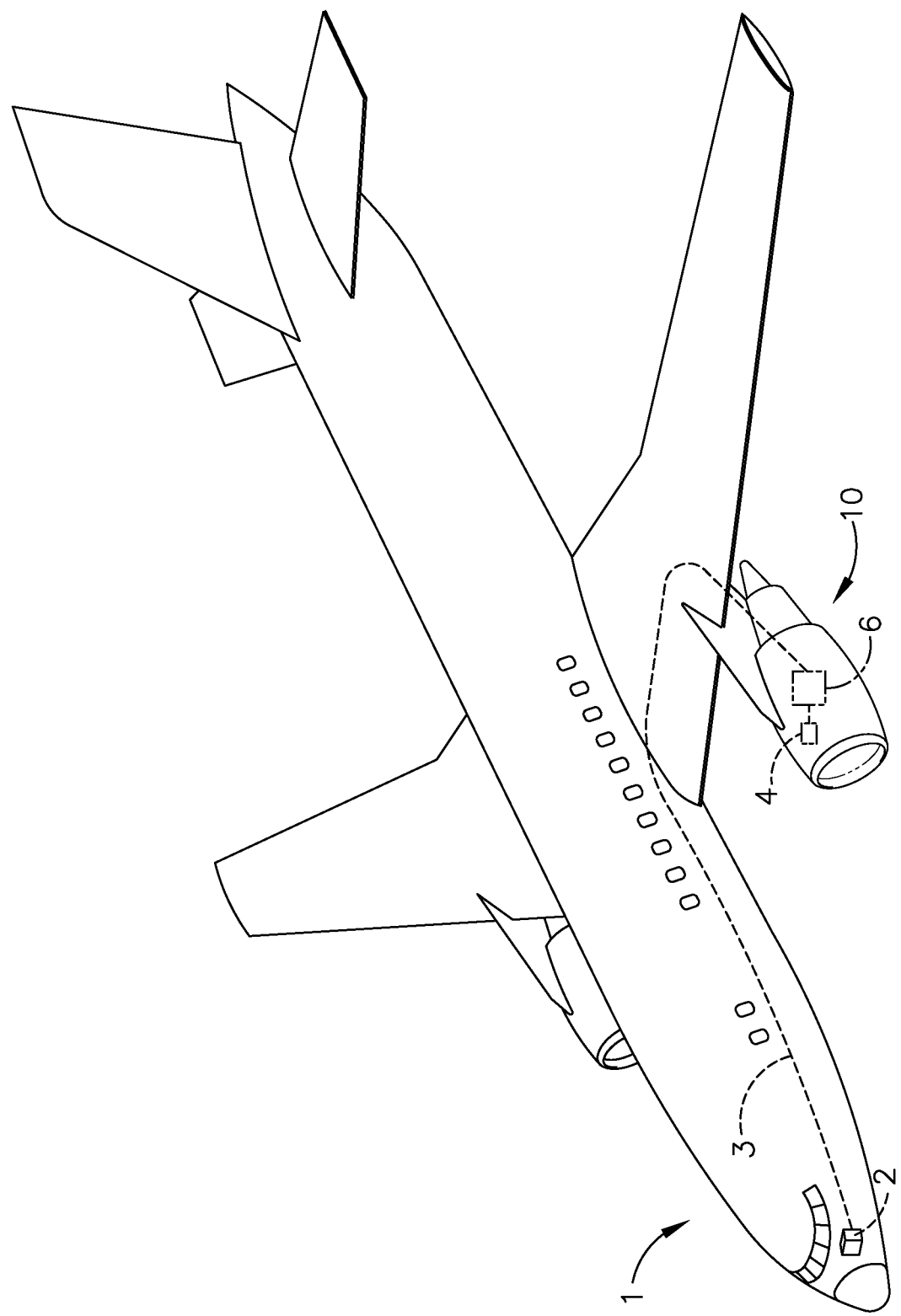
FIG. 1 is a schematic perspective diagram of an aircraft including health monitoring unit according to various aspects described herein

Aspects of the disclosure described herein are directed to a gearbox, or gearbox assembly, and monitoring system for a gearbox system. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 schematically illustrates an aircraft 1 with a health monitoring unit 2 and an engine control unit 6 (both shown in phantom) for monitoring various systems on the aircraft 1. Typically the engine control unit 6 monitors and collects data from an engine 10 and the health monitoring unit 2 collects data from various avionics instruments or sensors positioned about the aircraft. The data from the engine control unit 6 and health monitoring unit 2 can be used to monitor the health of the aircraft 1 and its engine components via prognostic and diagnostic use of the data. For example, a gearbox monitor 4 may be provided to monitor and collect sensor data associated with an engine power gearbox on engine 10. Data from the gearbox monitor 4 may be collected and transmitted to one or both of the engine control unit 6 or health monitoring unit 2 for real-time or subsequent diagnostic or prognostic analysis.

One or both of the engine control unit 6 and health monitoring unit 2 are typically in communication with aircraft network 3 and each can transmit data to other and to any aircraft component connected on the network 3. In addition, one or both of the health monitoring unit 2 and the engine control unit 6 can be in communication with a server having a processor and memory. The server can be located on the aircraft, or alternatively in a remote location such as a ground station. The server or ground station can be used to process data from either the engine control unit 6 or health monitoring unit 2 and determine whether there are any anomalies or variances in the data. For example, sensor data collected on an engine gearbox 6 maybe compared with other real-time vibration data or with historic vibration data stored in the memory.

While illustrated in a commercial aircraft, the gearbox monitoring system 4 can be used in any type of aircraft, for example, without limitation, fixed-wing, rotating-wing, rocket, commercial aircraft, personal aircraft, and military aircraft, as well as any vehicle requiring similar protection. The health monitoring unit 2 and the engine control unit 6 can be located anywhere within the aircraft, not just the nose and engine as illustrated.

Figure 2:
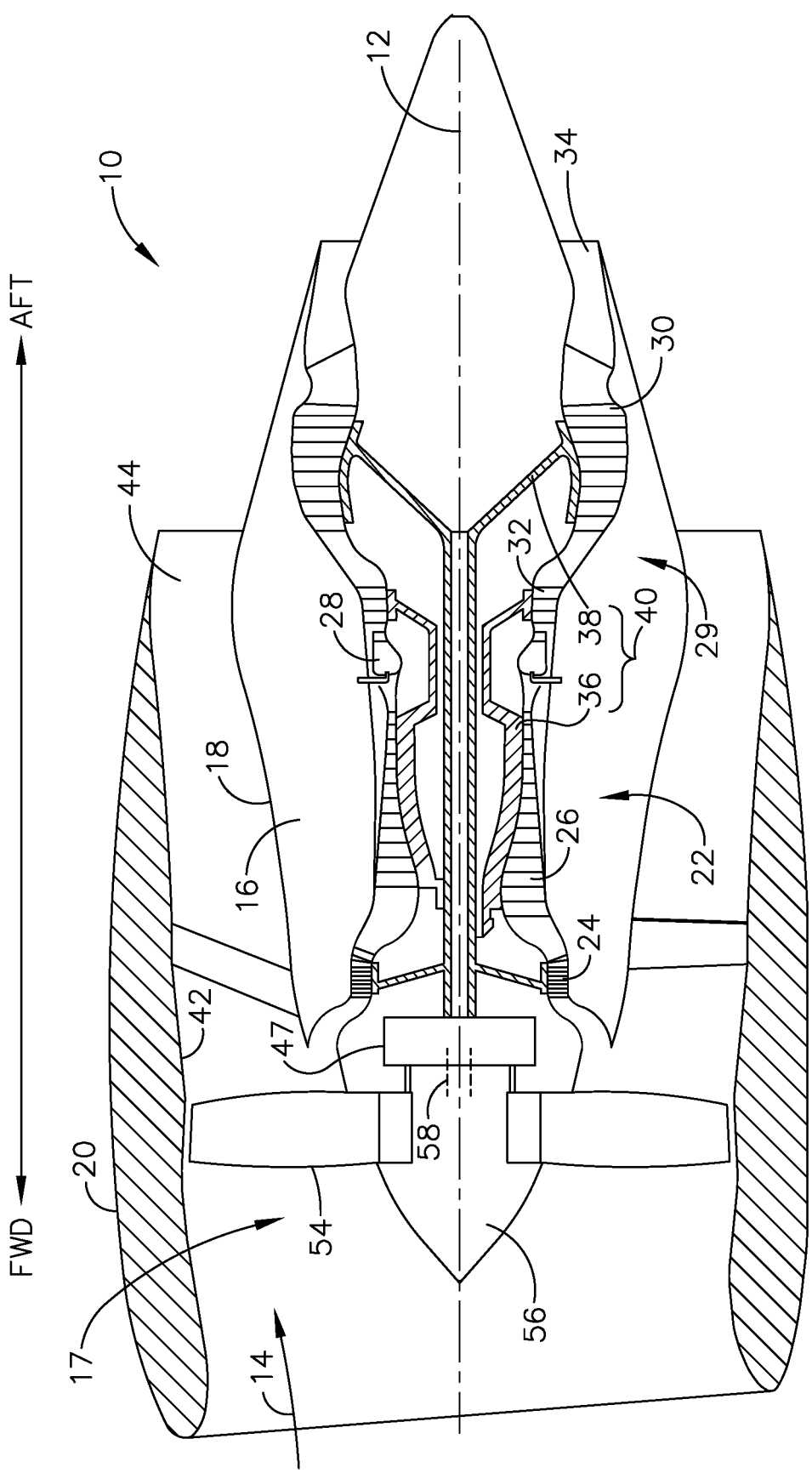
FIG. 2 is a schematic cross-sectional diagram of a gas turbine engine for an aircraft.

FIG. 2 illustrates the specifics of the engine 10 including a gearbox 47. In more detail, the turbine engine 10 has a longitudinally extending axis or centerline 12 extending from forward (FWD) to aft (AFT). A flow path 14 can be defined along the longitudinal axis 12. A turbine engine core 16, a fan assembly 17, and a nacelle 20 can be included in the turbine engine 10 in axial flow arrangement. The turbine engine core 16 can include a compressor section 22 having low pressure (LP) and high pressure (HP) compressor(s) 24, 26, a combustion section 28, a turbine section 29 having low pressure (LP) and high pressure (HP) turbine(s) 30, 32, and exhaust section 34. An inner core cowl 18, sometimes referred to as a shroud, radially surrounds the turbine engine core 16.

A high pressure (HP) shaft or spool 36 is disposed coaxially about the centerline 12 of the engine 10 drivingly connects the HP turbine 32 to the HP compressor 26. A low pressure (LP) shaft or spool 38, is disposed coaxially about the centerline 12 of the engine 10 within the larger diameter annular HP spool 36, drivingly connects the LP turbine 30 to the LP compressor 24. The spools 36, 38 are rotatable about the engine centerline 12 and couple to a plurality of rotatable blades or elements, which can collectively define and is hereinafter referred to as the engine rotor 40.

The nacelle 20 surrounds the engine 10 including the inner core cowl 18. In this manner, the nacelle 20 forms an outer cowl 42 radially surrounding the inner core cowl 18. The outer cowl 42 is spaced from the inner cowl 18 to form an annular passage 44 between the inner core cowl 18 and the outer cowl 42. The annular passage 44 can be a bypass duct, permitting a portion an airflow along the flow path 14 to bypass the engine core 16. The annular passage 44 characterizes and forms a generally forward-to-aft bypass airflow path.

Fan assembly 17 generally has a plurality of fan blades 54 coupled to a spinner 56 in a spaced apart manner. The fan blades 54 extend outwardly from the spinner 56 in a generally radial direction. Each fan blade 54 is rotatable relative to the spinner 56 about the longitudinal axis 12 via a fan shaft 58 that is driven by the LP spool 38 via a power gearbox 47. The power gearbox 47 includes a gearbox assembly having a plurality of gears for adjusting the rotational speed of the fan shaft 58 and thus a fan 17 relative to the LP spool 38.

Figure 3:
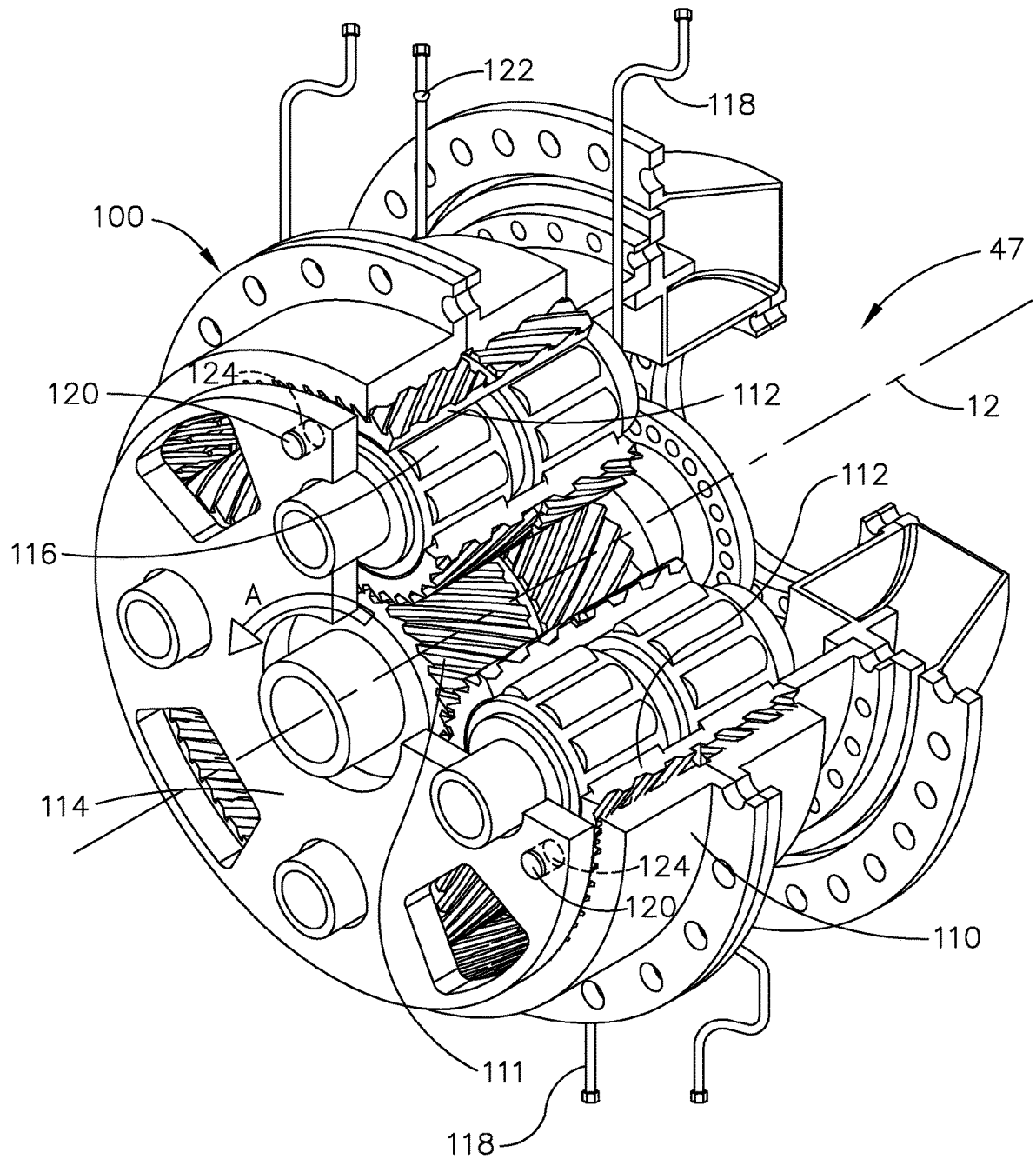
FIG. 3 is a perspective view of a gearbox assembly operating in a planetary configuration and including a monitoring system for the gearbox assembly for the gas turbine engine in FIG. 2.

FIG. 3 illustrates an exemplary gear, or gearbox, assembly 100 for a power gearbox 47 and includes components for monitoring portions of the gearbox assembly 100. A typical gearbox assembly 100 includes an epicyclic gear system including a centrally-located sun gear 111 that is rotatable about the centerline 12. One or more planet gears 112 can surround and engage with the sun gear 111 and are rotatable around a plurality of roller elements, or planet bearings 116. While FIG. 3 illustrates the planet gear 112 having two bearings 116, it is possible that the planet gear 112 includes only one, or more than two bearings 116. The bearings 116 can be any suitable bearings such as roller bearings, spherical bearings, or ball bearings. The gearbox assembly 100 can further include a ring gear 110 encircling the sun gear 111 and planet gears 112 enmeshed with both the sun gear 111 and the ring gear 110. Collectively the sun gear 111, the planet gears 112, and the ring gear 110 are housed by a carrier 114 and constitute the gearbox assembly 100 associated with the power gearbox 47. The planet bearings 116 rotationally support at least one of the sun gear 111, ring gear 110, or planet gear 112 relative to the carrier 114.

FIG. 3 illustrates the gearbox assembly 100 operating in a planetary configuration. In this configuration, the ring gear 110 is held stationary, while the carrier 114, planet gears 112 and sun gear 111 are free to rotate. Arrow, A illustrates rotation of the carrier 114 in the planetary configuration while the ring gear 110 is held stationary. As one of skill in the art may recognize, the gearbox assembly 100 includes rotating components and non-rotating, or stationary, components that can vary depending on the configuration of the gearbox assembly 100. For example, in a star configuration, the carrier 114 can be stationary while the ring gear 110 is rotatable.

The gearbox monitoring system 6 of FIG. 1 is generally the gearbox assembly 100 coupled with at least one vibration sensor 120 and an antenna 122 carried on or within the gearbox assembly 100. The vibration sensor 120 can be located on a rotatable component of the gearbox assembly 100, such as the carrier 114 due to the planetary configuration of gearbox assembly 100. The vibration sensor 120 can be in axial alignment with a bearing 116 such that the vibration sensor 120 is in close proximity with the bearing 116. Alternatively, the vibration sensor 120 can be located proximate one or more tubes, such as lubricant, or oil feed tubes 118 used to provide lubrication to the gearbox assembly 100. For the purpose of monitoring one or more bearings, the vibration sensor 120 can be mounted adjacent to or near an aperture 124 or a carve out in the carrier 114, or any other location for the vibration sensor 120, to help maximize the signal to noise ratio of the bearings. Similarly, if mounted at or near an oil feed tube 118, the sensor 120 can monitor the vibrations relating to flow or non-flow of oil in the oil feed tubes 118. Mounting the vibration sensor 120 at or near the source of vibration can help minimize noise from other sources. The aperture 124 can be in the form of a pilot hole or other small diameter hole that is machined into the carrier 114 such that the vibration sensor 120 can be located near of within the aperture 124.

The vibration sensor 120 can be any suitable vibration sensor 120, such as a piezo electric transducer or an accelerometer. It is contemplated that the vibration sensor 120 can use energy from vibrations to power the vibration sensor 120. For example, mechanical energy from vibrations can be converted into electrical energy to power the vibration sensor 120 by way of a vibration-powered generator. Vibrations measured by the vibration sensor 120 can include bearing 116 vibrations or lubricant/oil flow vibrations. The vibration sensor 120 can output a signal indicative of the bearing 116 vibrations, oil flow vibrations, or any other vibrations measured by the vibration sensor 120.

The antenna 122 can be located on a stationary component of the gearbox assembly 100. Thus, the antenna 122 can be carried by or in the oil feed tubes 118, which are generally stationary regardless of the gearbox assembly 100 configuration. Alternatively, the antenna 122 can be carried on a tube or other structure within the gearbox assembly 100 that does not feed oil.

The antenna 122 can be in wireless communication with the vibration sensor 120 and also in communication with one of the engine control unit 6 or the health monitoring unit 2. Vibration data can be in a frequency domain or a time domain for analysis of the vibration data. Vibration data can be transmitted from the vibration sensor 120 to the antenna 122 and further from the antenna 122 to the engine control unit 6 or the health monitoring unit 2. The vibration data can be transmitted from the engine control unit 6 or the health monitoring unit 2 to the server or ground station where the processor can compare the vibration data with historic vibration data that is stored in the memory in order to assess the health of the components of gearbox assembly 100. Moreover, the processor can compare the vibration data with a sample set of vibration data in order to detect anomalies in the vibration data. Maintenance needs or can be diagnosed or predicted by the comparisons and anomalies detected by the processor.

Figure 4:
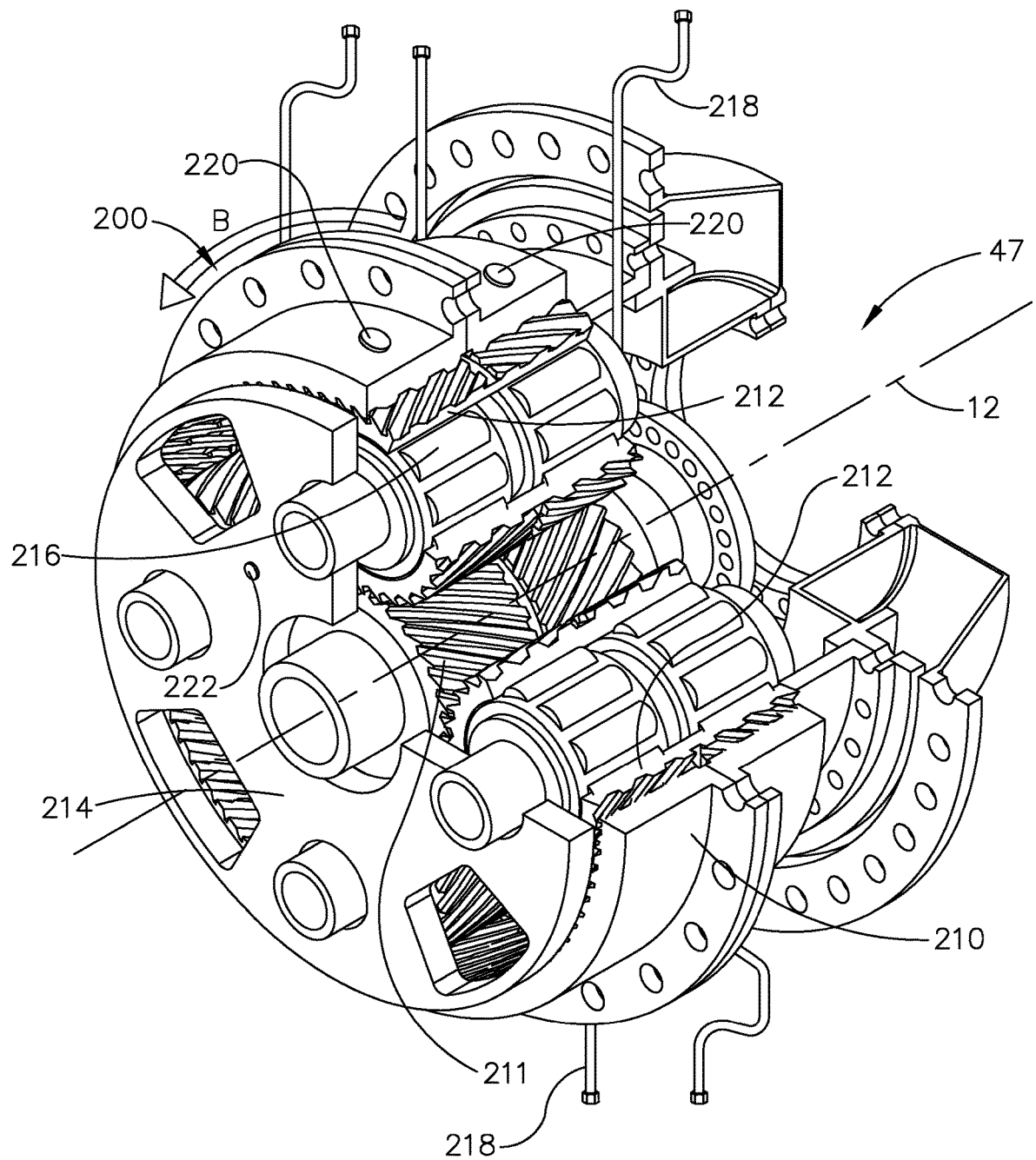
FIG. 4 is a perspective view of a gearbox assembly operating in a star configuration and including a monitoring system for the gearbox assembly for the gas turbine engine in FIG. 2.

FIG. 4 illustrates an exemplary gear, or gearbox, assembly 200 in a star configuration including components for monitoring portions of the gearbox assembly 200. Since the gearbox assembly 200 is similar to the gearbox assembly 100; like parts will be identified with like numerals increased by 100, with it being understood that the description of the like parts of gearbox assembly 100 applies to gearbox assembly 200, unless otherwise noted.

As illustrated in FIG. 4, the carrier 214 is held stationary, while the ring gear 210, planet gears 212 and sun gear 211 are free to rotate. An arrow, B, illustrates rotation of the ring gear 210 for the star configuration. Since gearbox assembly 200 is a star configuration, the vibration sensor 220 can be located on the ring gear 210. Additionally, the antenna can be carried by the carrier 214, as the carrier 214 is stationary in the star configuration.

A method of monitoring a gas turbine engine having a gearbox 100 can include sensing vibrations of at least one bearing 116 in the gearbox 100 with a vibration sensor 120 located on the gearbox 100 and outputting a vibration signal, converting the vibration signal into vibration data relative to time, and transmitting the vibration data to a health monitoring unit 2. The method can optionally include comparing the vibrations data to historic vibrations data or within a sample set for anomalies. Furthermore, the method can include the vibration sensor 120 mounted in axial alignment with the at least one bearing 116.

It should be appreciated that application of the disclosed design is not limited to turbine engines with fan and booster sections, but is applicable to turbojets and turbo engines as well. Furthermore, the disclosed design is applicable to an accessory gearbox, not just a power gearbox as described. Benefits of aspects described herein can include early detection of an impending bearing or rotating seal failure in a gearbox. Early detection of an impending bearing or seal failure can enable scheduling maintenance at a convenient time for the customer, and prevent an in-flight failure. Furthermore, by locating the vibration sensor as close as possible to the target bearing or seal, the signal to noise ratio is maximized, providing the best indication of the health of the bearing or seal. Thus, placing the vibration sensor in close proximity to bearings or seals that are subject to deterioration will give the best indication of impending failure. Additionally, using a wireless sensor enables mounting the sensor on the planet carrier in a gearbox assembly or other rotating locations that are not possible with a wired sensor.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gearbox assembly comprising:
    a carrier;
    a sun gear, a ring gear encircling the sun gear, and a planet gear enmeshed with both the sun gear and ring gear;
    an oil feed tube coupled to the gearbox assembly for lubricating at least one of the sun, ring or planet gears;
    a plurality of bearings rotationally supporting at least one of the sun gear, ring gear, or planet gear relative to the carrier; and
    at least one vibration sensor carried by one of the carrier or ring gear.

2. The gearbox assembly of claim 1 wherein the vibration sensor is mounted adjacent with one of the plurality of bearings.

3. The gearbox assembly of claim 2 wherein the vibration sensor comprises a vibration-powered generator.

4. The gearbox assembly of claim 2 wherein the vibration sensor is one of a piezo electric transducer or an accelerometer.

5. The gearbox assembly of claim 1 further comprising an aperture in one of the carrier or ring gear to mount the at least one vibration sensor.

6. The gearbox assembly of claim 1 wherein the at least one vibration sensor outputs a signal indicative of one of bearing vibrations or oil vibrations.

7. The gearbox assembly of claim 1 further comprising an antenna in communication with the vibration sensor.

8. The gearbox assembly of claim 7 wherein the antenna is mounted on the oil feed tube.

9. The gearbox assembly of claim 8 wherein the oil feed tube is non-rotating.

10. The gearbox assembly of claim 9 wherein the antenna is in wireless communication with one of an engine control unit or a health monitoring unit.

11. The gearbox assembly of claim 1 wherein the gearbox assembly is an epicyclic gearbox.

12. A method of monitoring a gas turbine engine having the gearbox assembly of claim 1, the method comprising:
- sensing vibrations of at least one of the plurality of bearings with the at least one vibration sensor and outputting a vibration signal indicative of the sensed vibrations;
- converting the vibration signal into vibration data; and
- transmitting the vibration data to a health monitoring unit.

13. The method of monitoring a gas turbine engine of claim 12 further comprising the step of comparing the vibrations data to historic vibrations data or within a sample set for anomalies.

14. The method of monitoring a gas turbine engine of claim 13 wherein the vibration data is in one of a time or frequency domain.

15. A gearbox monitoring system for an aircraft engine comprising:
- a fan, compressor, combustor, and turbine in axial flow arrangement, with corresponding rotating components mounted to a shaft;
- a gearbox assembly operably coupled to the shaft and connecting the turbine and the fan; the gearbox assembly comprising:
  - a carrier;
  - a sun gear, a ring gear encircling the sun gear, and a planet gear enmeshed with both the sun gear and ring gear;
  - an oil feed tube coupled to the gearbox assembly for lubricating at least one of the sun, ring or planet gears;
  - a plurality of bearings rotationally supporting at least one of the sun gear, ring gear, or planet gear relative to the carrier; and
  - at least one vibration sensor carried by one of the carrier or ring gear and in wireless communication with an engine control unit or health monitoring unit.

16. The gearbox monitoring system of claim 15 wherein the antenna is mounted on the oil feed tube.

17. The gearbox monitoring system of claim 15 further comprising an antenna in communication with the at least on vibration sensor and carried in the oil feed tube.

18. The gearbox monitoring system of claim 17 wherein vibration data is transmitted via the antenna to one of the engine control unit or the health monitoring unit.

19. The gearbox monitoring system of claim 18 further comprising a processor and a memory in communication with one of the engine control unit or the health monitoring unit.

20. The gearbox monitoring system of claim 17 further comprising historic vibration data or a sample set of data stored in the memory for comparison with the vibration data.

* * * * *